March 6, 1945.　　　B. M. CHARCHIAN　　　2,370,637
FREQUENCY MULTIPLIER
Filed Oct. 27, 1942
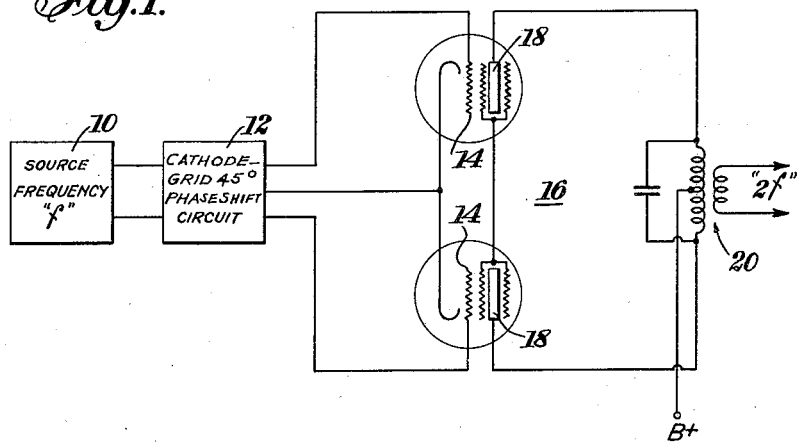
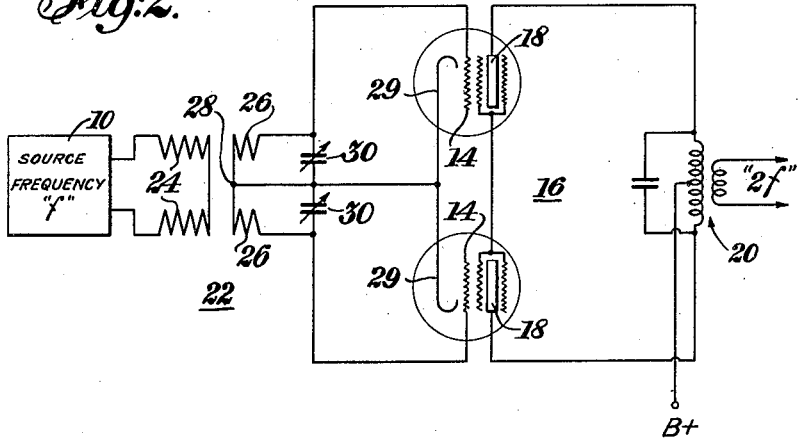
INVENTOR.
BENJAMIN MALCOLM CHARCHIAN
BY
ATTORNEY Patented Mar. 6, 1945

2,370,637

UNITED STATES PATENT OFFICE 2,370,637

FREQUENCY MULTIPLIER

Benjamin Malcolm Charchian, New York, N. Y., assignor to Federal Telephone and Radio Corporation, Newark, N. J., a corporation of Delaware Application October 27, 1942, Serial No. 463,512

3 Claims. (Cl. 250—36)

This invention relates to improvements in frequency multipliers, and more particularly to a push-pull frequency multiplier capable of producing even harmonic frequencies.

An object of this invention is to provide a novel push-pull frequency multiplier capable of producing even harmonic frequencies.

Another object of this invention is to provide a frequency multiplier capable of producing a balanced even harmonic output.

A specific object of this invention is to provide a push-pull frequency doubler.

In the ordinary push-pull circuit the even harmonics are canceled due to the 180° phase difference between the grids. While this is extremely advantageous for certain purposes, it prevents the use of the push-pull circuit as a frequency multiplier when it is desired to produce even harmonics, as in a frequency doubler. I have discovered, however, that if the phase difference between the grid input voltages is 90° the even harmonics are not canceled in the output circuit, and a properly tuned output circuit is then capable of producing these even harmonics with a balanced output. This is advantageous in comparison with known frequency doublers using multiple tubes as, for example, the so-called "push-push" doubler whose output is wholly unbalanced and in which the plate capacity is doubled. In contrast to this arrangement, applicant's invention provides a multiplier in which the plate capacities are in series, or halved.

Other objects and advantages of the present invention will appear from the following description of a general and a specific embodiment of my invention illustrated in the accompanying drawing, in which:

Fig. 1 is a circuit diagram generally illustrating the principles of my invention as applied to a push-pull amplifier; and Fig. 2 is a similar circuit diagram illustrating the present invention in connection with a specific form of phase shifting circuit.

In accordance with the present invention a source of frequency 10, an even harmonic frequency of which it is desired to produce, is connected through a phase-shifting circuit indicated at 12 to the push-pull grids 14 of the push-pull amplifier 16. The anodes 18 are then connected to a tank circuit 20 tuned to the harmonic which it is desired to produce, and the output from this tank circuit will accordingly have the desired frequency. In the example illustrated in Fig. 1, I have shown a frequency doubler in which output from the tank 20 has a frequency 2f as compared with the source frequency f. The phase-shifting circuit 12 interconnected between the frequency source 10 and the push-pull amplifier 16 is so designed as to produce a balanced 90° phase difference between the voltages applied to the grids 14. In the form of invention illustrated, the phase-shifting circuit 12 may shift the phase 45° in opposite directions relatively to the mid-point. The same result can be obtained, however, if the phase shift produced by the circuit 12 is 225° in opposite directions about the neutral point, or any relative phase shift which will still result in an effective 90° phase difference between the voltages applied to the grids of the amplifier.

By producing a 90° phase shift between the voltages applied to the grids of the push-pull amplifier the even harmonics which are ordinarily canceled in the usual push-pull amplifier are retained and will accordingly be reproduced in the output circuit connected to the tank 20.

As far as the basic principles of this invention are concerned the type of phase-shifting circuit used for applying the 90° phase-shifted voltages to the grids of the push-pull amplifier is unimportant. Fig. 2, however, shows a preferred arrangement which operates extremely well at high frequencies. In this form of invention the frequency source 10 is coupled to the push-pull amplifier 16 by means of a specially balanced transformer coupling 22 such as disclosed in my co-pending application Serial No. 462,720, filed October 20, 1942. Such a transformer may consist of a primary winding comprising two identical oppositely wound cylindrical coils 24 connected together at one end, with a secondary winding consisting of two identical oppositely wound cylindrical coils 26 connected together at one end, the coils of the primary and secondary being positioned face to face at their interconnected ends with one coil of the primary being coaxial with one coil of the secondary and the other coil of the primary being coaxial with the comparable other coil of the secondary. To decrease mutual inductance between the coils of one winding, the two are spaced relatively far apart, as indicated. The mid-point 28 between the coils 26 of the secondary is preferably connected to the cathodes 29 of the amplifier tubes and suitable condensers 30 are respectively connected across the individual secondary winding coils. The condensers 30 together with the coils 26 produce the required 45° or 225° phase shift between the voltages applied to the grids 14. The output circuit is identical with that described above in connection with Fig. 1.

The system described fulfills the objects and realizes the advantages of the invention. The balanced output resulting from the use of a push-pull amplifier is obtained, while at the same time the even harmonics are not eliminated and may be obtained by a proper tuning of the tank circuit. While the invention has been specifically described in connection with its use as a frequency doubler, it will be obvious that it can be used to produce other even harmonics, depending upon the tuning of the tank circuit.

It is to be clearly understood that the description of this invention is made only by way of example, and not as a limitation on the scope of my invention as set forth in the objects and the accompanying claims.

I claim:

1. A frequency multiplier comprising, in combination, a source of power of a predetermined frequency, a push-pull amplifier, a circuit tuned to an even harmonic of said predetermined frequency, connected between the anodes of said push-pull amplifier, and phase-shifting means connected between said source of power and the grids of said push-pull amplifier of such a value that the voltage applied to one grid is 90° out of phase with the voltage applied to the other grid.

2. A frequency doubler comprising, in combination, a source of power of a predetermined frequency, a push-pull amplifier, a circuit tuned to twice said predetermined frequency, connected between the anodes of said push-pull amplifier, and means for producing a 45° phase shift in opposite directions connected between said source of power and the grids of said push-pull amplifier, so that said grids will be energized 90° out of phase.

3. A frequency multiplier comprising, in combination, a source of power of a predetermined frequency, a push-pull amplifier, a circuit tuned to an even harmonic of said predetermined frequency, connected between the anodes of said push-pull amplifier, a transformer having a primary winding connected to said source of power, and a center-tap secondary winding whose midpoint is connected to the cathodes of said push-pull amplifier, and means for connecting the outer ends of said secondary winding to the respective grids of said push-pull amplifier, said means including a phase-shifting circuit cooperating with said secondary winding for producing equal and opposite phase shifts in the voltages applied to said grids, so that the applied voltages are 90° out of phase.

BENJAMIN MALCOLM CHARCHIAN.